Figure 1:
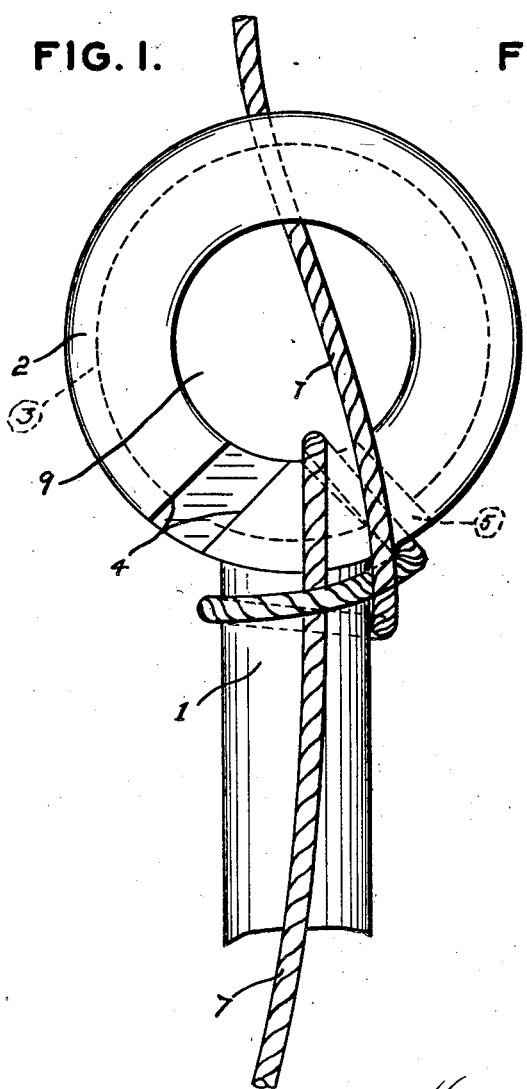

Sept. 4, 1934.   H. V. WHITE   1,972,725
LINE ATTACHMENT
Filed April 14, 1934

Holland V. White INVENTOR.
BY Loyal Miller
ATTORNEYS.

Patented Sept. 4, 1934

1,972,725

UNITED STATES PATENT OFFICE 1,972,725

LINE ATTACHMENT

Holland V. White, Hinton, Okla., assignor to Maurice Seigle and William Seigle, Hinton, Okla.

Application April 14, 1934, Serial No. 720,550

8 Claims. (Cl. 24—129)

My invention relates to a line attachment for either securing or slidably connecting any line to any object.

Any of the many present forms of hooks having a direct opening for receiving a line have the inherent disadvantage of the possibility of losing the line through this same opening. Also in the construction of hooks, and especially those designed for heavy loads, a massive section of special construction is necessary at points where there are both compressive and tensional stresses through the same section. This massive or thick portion of such hooks often prevents its passage through limited openings.

In the use of any eye bolt, ringlet or endless loop now used for the attachment of lines it is necessary to pass the end of the line or a folded portion of it through the eye before the line can be secured thereto. It is also necessary in either case to knot or tie the line before anchorage can be had. In any eye bolt the possibility of joining it with another endless member without a break in either member is precluded.

My invention is adaptable wherever it is desired to secure a line of any nature to any object. My invention, strictly speaking, is neither an eye bolt, nor a hook, yet it combines the best qualities of each.

Because of the unique construction of my attachment it is possible to pass a line intermediate its ends or any portion of an endless line into the device and through the opening for slipping on said line, or for making a hitch thereon.

My invention is especially adaptable where fast and positive hitchings are desired, as in hoisting, holding or traction devices.

My invention is particularly desirable for running or sliding connections since it embodies the combined features of quickly and easily receiving any line at any mid-section as well as positively holding it from becoming disengaged.

Due to the eye bolt form of my invention it is impossible for a line to slip out of engagement as in the case of the ordinary hook. Also, and for the same reason, it is not necessary that different sections of my attachment be stronger than other sections and consequently out of proportion, overcumbersome or bulky. My invention may be so proportionally constructed that all sections will contain the same cross sectional area thereby providing an attachment which will have maximum strength with minimum size.

The objects of my invention are to provide a device of the class described which is new, novel, practical and of utility.

A further object of the invention is to provide a line attachment which will receive an endless line and yet which will not permit such line to be disengaged without special manipulation.

A still further object is to provide a device of the class described which may be easily and quickly placed upon or taken from a line at any place intermediate its ends without in any manner disturbing either end of the line.

A still further object is to provide a device of the class described which provides easy means of quickly introducing the line thereinto and easy means for quickly removing the line therefrom.

A still further object of my invention is to provide an attachment which may be lighter and smaller than any present one with corresponding strength.

Figure 2:
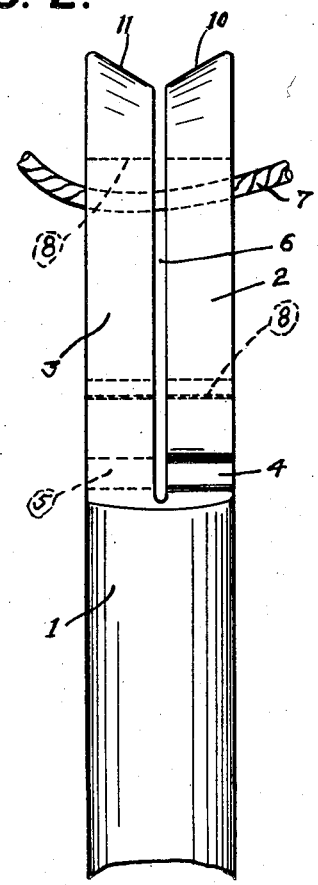

With these and other objects in view as will more fully appear hereinbelow, my invention consists in the construction, novel features, and combination of parts hereinafter more fully described, pointed out in the claims hereto appended, and illustrated in the accompanying one-sheet drawing, of which, Figure 1 is a front or back side elevational view of a line attachment embodying the invention and showing one particular line hitch especially adapted to be used with my invention; and, Fig. 2 is an edge elevational view of the same line attachment showing a fragment of an endless line passing therethrough.

Like characters of reference designate like parts in all the figures.

It is understood that various changes in the form, proportion, size, shape, weight and other details of construction, within the scope of my invention may be resorted to without departing from the spirit or broad principle of my invention and without sacrificing any of the advantages thereof; and it is also understood that the drawing is to be interpreted as being illustrative and not restrictive.

A description of one practical embodiment of the invention as illustrated in the drawing follows:

In the drawing the reference numeral 1 indicates the stem or portion of the attachment adapted to be fastened to some object or base. Reference numerals 2 and 3 indicate the front and back segments attached to the stem 1. The numerals 4 and 5 indicate transverse openings or gaps in the segments 2 and 3 respectively. The numeral 6 indicates the bifurcating slot or space between the segments 2 and 3 and the numeral 7 refers to any desired cable or line which may pass through or be secured to the attachment or both. The numeral 9 refers to the large center opening, hole or eye formed by the inner edges 8 of the segments 2 and 3.

The ease with which lines may be passed through the opening 9 make certain hitches particularly adaptable to my invention.

One of such hitches is illustrated in Fig. 1. Beginning with the lower portion of the line 7 of Fig. 1, the line having been passed through the opening 9, it is then passed downwardly across the segment 3 and wrapped at least one and a half times around the stem 1 and then inserted in gap 4 and passed through space 6 thence through gap 5 and into the opening 9.

A line may be passed through the opening 9 by placing it in the gap 4, forcing it under the free end of the segment 2 and between the segments 2 and 3 and then sliding it clockwise in the space 6 around to the free end of the segment 3, at which point it becomes free again through the gap 5 and passes through hole 9. It will be readily seen that this process is reversible; also that the same results are secured by first placing the line in the gap 5 and repeating the above described movements. Another method of causing a line to pass through the opening 9 is to place it across the top of the attachment at the upper outer extremity of the space 6 and in a plane parallel to the front or back of the device, pass it downwardly through the space 6 between the segments 2 and 3 to and into the gaps 4 and 5, which open to the front and back side respectively of the attachment, a slight turn of the device or the line causes the line to become free though now enclosed within the hole 9 with the segments 2 and 3.

It is to be understood that the gaps 4 and/or 5 may be disposed at any point on the circumference of the segments.

The space 6 may be disposed of if desired in which case a line may be forced between the segments 2 and 3 and causing a slight circumferential torsional stress in the segments.

The beveled portions 10 and 11 of the outer edges of the segments 2 and 3 are for more easily guiding the line into the space 6. This is the more important when the line to be introduced is heavy and of a large calibre.

Obviously, the invention is susceptible of embodiment in forms other than that which is illustrated in the accompanying drawing and described herein and applicable for uses and purposes other than as detailed, and I therefore consider as my own all such modifications and adaptations and other uses of the form of the device herein described as fairly fall within the scope of my invention.

Having thus described my invention, what is claimed and desired to be secured by Letters Patent, is:

1. A line attachment embodying, a base, two co-axially disposed ring-like members rigidly attached to the base and adapted to be sprung sufficiently apart to permit insertion of a line therebetween, each member having a radial opening from its bore to its periphery for permitting passage of the line therethrough.

2. A line attachment embodying, a base, two co-axially disposed ring-like members rigidly attached to the base and adapted to be sprung sufficiently apart to permit insertion of a line therebetween, each member having a radial opening from its bore to its periphery for permitting passage of the line therethrough, said openings occurring at opposite sides of the base.

3. Organization as described in claim 1, in which a peripheral groove is complementally formed by the two members for expediting insertion of a line therebetween.

4. A line attachment embodying, a base, two adjacent co-axially disposed ring-like members attached to the base and adapted to receive a line therebetween, each member having a radial opening from its bore to its periphery for permitting passage of the line therethrough.

5. A line attachment embodying, a base, two adjacent co-axially disposed ring-like members attached to the base and adapted to receive a line therebetween, each member having a radial opening from its bore to its periphery for permitting passage of the line therethrough, said openings positioned at opposite sides of the base.

6. Organization as described in claim 4, in which a peripheral groove is complementally formed by the two members for expediting insertion of a line therebetween.

7. A line attachment embodying, a base, two adjacent co-axially disposed ring-like members attached to the base and adapted to receive a line therebetween, each member having a radial opening from its bore to its periphery for permitting passage of the line therethrough, said openings disposed at relatively different radial positions.

8. A line attachment embodying, a base, two co-axially disposed ring-like members rigidly attached to the base and adapted to be sprung sufficiently apart to permit insertion of a line therebetween, each member having a radial opening from its bore to its periphery for permitting passage of the line therethrough, said openings disposed at relatively different radial positions.

HOLLAND V. WHITE.